United States Patent
Vargantwar et al.

(10) Patent No.: US 8,614,964 B1
(45) Date of Patent: Dec. 24, 2013

(54) SPECIFICATION OF FORWARD-LINK RATE CONTROL BASED ON NEIGHBOR LOAD

(75) Inventors: Sachin R. Vargantwar, Overland Park, KS (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 206 days.

(21) Appl. No.: 13/110,043

(22) Filed: May 18, 2011

(51) Int. Cl.
*G01R 31/08* (2006.01)

(52) U.S. Cl.
USPC .......................................... 370/252

(58) Field of Classification Search
None
See application file for complete search history.

(56) References Cited

U.S. PATENT DOCUMENTS

| | | | |
|---|---|---|---|
| 2002/0071419 A1* | 6/2002 | Paranchych et al. | 370/342 |
| 2002/0146024 A1* | 10/2002 | Harris et al. | 370/417 |
| 2005/0286440 A1* | 12/2005 | Strutt et al. | 370/253 |
| 2006/0256709 A1* | 11/2006 | Yang | 370/206 |
| 2007/0121552 A1* | 5/2007 | Lindoff | 370/333 |
| 2009/0285159 A1* | 11/2009 | Rezaiifar et al. | 370/328 |
| 2010/0008323 A1* | 1/2010 | Deshpande et al. | 370/331 |

* cited by examiner

*Primary Examiner* — Chirag Shah
*Assistant Examiner* — Rina Pancholi

(57) ABSTRACT

A method and system is disclosed for forward-link data-rate request determination based on neighbor load. An access terminal in a wireless communication system that includes a plurality of base stations will determine an initial requested forward-link data rate by measuring a signal-to-noise ratio (SNR) of the forward link from its serving base station. The access terminal will then use information indicative of forward-link traffic load of its neighboring base stations to modify its initial determination, whereby the access terminal will increase its initial determination if the average forward-link traffic load of its neighboring base stations is below a threshold load. The access terminal will then transit its forward-link data-rate request (initial or increased) to its serving base station.

16 Claims, 11 Drawing Sheets

| SINR UPPER LIMIT (dB) | DRC CODE | FORWARD-LINK DATA RATE (kbps) | PACKET LENGTH (Slots) |
|---|---|---|---|
| -10.4 | 0 | Null | N/A |
| -7.6 | 1 | 38.4 | 16 |
| -4.6 | 2 | 76.8 | 8 |
| -2.8 | 3 | 153.6 | 4 |
| -1.5 | 4 | 407.2 | 2 |
| 0.5 | 5 | 407.2 | 4 |
| 1.6 | 6 | 614.4 | 1 |
| 3.4 | 7 | 614.4 | 2 |
| 4.8 | 8 | 921.6 | 2 |
| 5.9 | 9 | 1,228.8 | 1 |
| 8.1 | 10 | 1,228.8 | 2 |
| 10.4 | 11 | 1,843.2 | 1 |
| 11.8 | 12 | 2,457.6 | 1 |

FIG. 5

SPECIFICATION OF FORWARD-LINK RATE CONTROL BASED ON NEIGHBOR LOAD

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. As the AT moves beyond the threshold range of one or another of its soft handoff sectors and into the range of one or more other sectors, usual handoff procedures are used to update the particular sectors with which the AT is in soft handoff.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

OVERVIEW

An AT receives data from a base station (or sector or a BTS) on a "forward link" and sends data to the base station on a "reverse link." Data on either link are encoded and transmitted by the sender and received and decoded by the receiver. For packet-data communications, the encoded data is assembled into packets which are then transmitted. The rate at which a given amount of packet data is transmitted (i.e., the "data rate") corresponds the "density" of data in each packet, and is governed largely by the scheme used to encode the data. The data rate that can be reliably achieved on a link depends on the ability of the receiver to successfully decode the received encoded data, which in turn depends, at least in part, on the RF conditions between the transmitting and receiving entities on that link.

RF conditions are typically measured as some form of signal-to-noise ratio ("SNR"). Generally, the higher the SNR, the higher the achievable data rate, and vice versa. The signal power level (the numerator in the SNR) measured by a receiving entity (e.g., the AT for the forward link) depends on the transmission power level of the transmitting entity and on the distance between the transmitting and receiving entities, among other possible factors. The noise (the denominator in the SNR) depends on other transmitting sources, such as neighboring base stations, and reflections of signals off buildings and other structures, for example. By adjusting the encoding scheme according to the SNR at any given time, the data transmission rate can thus be optimized for the prevailing RF conditions.

In particular, under IS-856 an access terminal periodically measures the SNR of its forward link from its "serving" base station, and then informs the serving base station of a requested data rate, conventionally determined based on the measured SNR. The serving base station then uses an encoding scheme that achieves the requested data rate. In practice, the AT selects one of a list of predetermined data rates based on the measured SNR, and the base station uses a corresponding, predetermined encoding scheme based on the data rate selected by the AT and communicated in a request message to the base station. The AT makes its selection by comparing the measured SNR with a set of preconfigured threshold SNR values, each corresponding to one of the predetermined data rates.

Encoded data packets bound for access terminals are transmitted during periodically-repeating, forward-link timeslots of equal durations. Timeslots are synchronized across all base stations (or sectors) of a wireless communication system. Every time-slot transmission contains a fixed, system-related portion dedicated to system and/or control data, and a traffic-data portion available for encoded packet data. Depending on the encoded data rate, a given packet may take up one or more timeslots. Since the base station does not necessarily have user data to transmit during every timeslot, some time-slot transmissions may be empty or "idle" with respect to user data packets. The ratio of the number of non-idle timeslots during a given time window to the total number of all timeslots (idle and non-idle) during the given window is commonly referred to the time-slot utilization, and is a fraction in the range [0, 1]. In general, the higher the time-slot utilization for a base station, the larger the fraction of time that the base station's forward link carries data traffic, and vice versa. Time-slot utilization can also be considered as measuring a forward-link traffic load of the base station.

The fixed, system-related portion of every timeslot includes a "pilot" signal, or pilot "burst," from the base station, which is used by the AT to identify the base station, acquire and/or maintain a timing reference, and determine the signal strength of the base station. In particular, the AT determines the SNR of its serving base station by comparing the strength of the pilot burst of its serving base station with that of simultaneously received pilot bursts of one or more neighboring base stations (or sectors). During the traffic-data portion of a timeslot, when the AT decodes data, the actual amount of interference due to transmissions from the one or more neighboring base stations (or sectors) will depend, at least in part, on the time-slot utilization of each of those base stations (or sectors). If the utilizations of the neighboring sectors are high, then the interference may be high, and vice versa. Yet, in conventional operation, the data rate that the AT requests from its serving base station is based only on an SNR measurement made during the pilot-burst portion of timeslots, when no traffic data are transmitted, and therefore takes no account of the time-slot utilizations of the neighboring base stations (or sectors). It would therefore be advantageous to include consideration of forward-link traffic load of neighboring base stations in an access terminal's determination of requested forward-link data rate.

Hence in one respect, various embodiments of the present invention provide, in an access terminal configured to operate in a wireless communication system that includes a plurality of wireless coverage areas, a method comprising: determining a signal-to-noise ratio (SNR) measurement of a forward link from a serving wireless coverage area of the plurality based on a ratio of (i) a transmission power level of a serving signal received from the serving wireless coverage area to (ii) a transmission power level of a contributing signal received concurrently from each of at least one other wireless coverage areas of the plurality; receiving a message from the wireless communication system with information indicative of a forward-link traffic load of one or more wireless coverage areas of the plurality other than the serving wireless coverage area; determining a requested forward-link data rate from the serving wireless coverage area based on both the SNR measurement and the forward-link traffic load of the one or more wireless coverage areas; and transmitting the requested forward-link data rate to the serving wireless coverage area.

In another respect, various embodiments of the present invention provide, in a base station configured to operate as part of a wireless communication system, a method comprising: at the base station, determining a respective forward-link traffic load of each of one or more wireless coverage areas in a neighbor list of an access terminal being served by the base station; at the base station, determining an updated neighbor list by adding to the neighbor list information indicative of the respective forward-link traffic load of each of the one or more wireless coverage areas; and at the base station, transmitting the updated neighbor list to the access terminal.

In still another respect, various embodiments of the present invention provide an access terminal configured to operate in a wireless communication system that includes a plurality of wireless coverage areas, the access terminal comprising: means for determining a signal-to-noise ratio (SNR) measurement of a forward link from a serving wireless coverage area of the plurality based on a ratio of (i) a transmission power level of a serving signal received from the serving wireless coverage area to (ii) a transmission power level of a contributing signal received concurrently from each of at least one other wireless coverage areas of the plurality; means for receiving a message from the wireless communication system with information indicative of a forward-link traffic load of one or more wireless coverage areas of the plurality other than the serving wireless coverage area; means for determining a requested forward-link data rate from the serving wireless coverage area based on both the SNR measurement and the forward-link traffic load of the one or more wireless coverage areas; and means for transmitting the requested forward-link data rate to the serving wireless coverage area.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 5 is an example table of forward-link rate-control parameters and associated data rates and packet lengths.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1X-RTT may be similarly distinguished. Absent any specific version identification, EVDO will generally refer to any version of IS-856, and vice versa. It should be understood that the present invention can apply to other wireless voice and data protocols including, without limitation, IS-95, UMTS, LTE, WiFi, WiMax, and GSM, which, together with IS-2000 and IS-856 are considered herein, individually or in any combination, to comprise a CDMA family of protocols.

Figure 1:
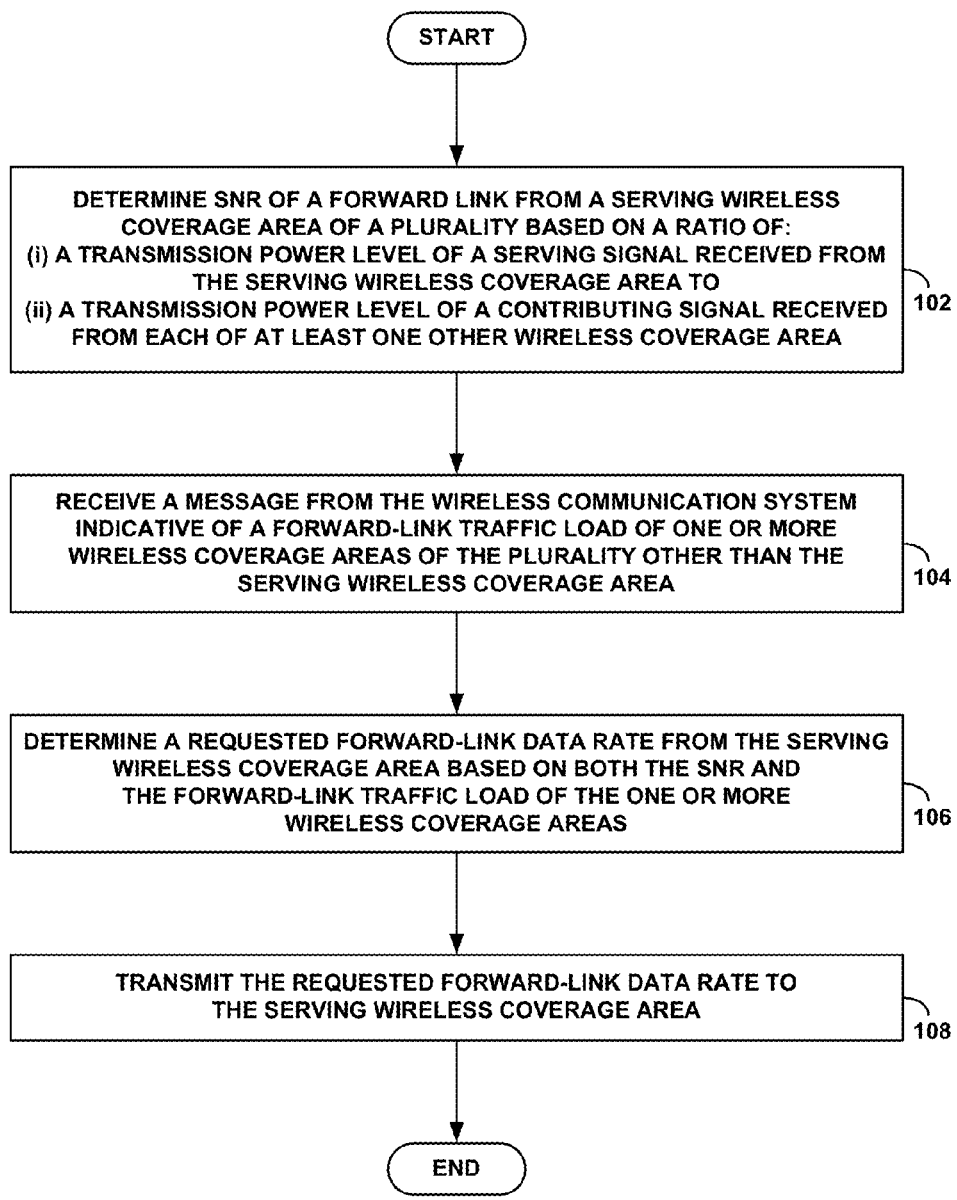
FIG. 1 is a flowchart illustrating an example embodiment of forward-link data-rate request determination based on neighbor load.

FIG. 1 is a flowchart illustrating an example embodiment of forward-link data-rate request determination based on neighbor load. By way of example, the steps of the flowchart could be implemented in an access terminal configured to operate according to a CDMA family of protocols, including IS-856, in a similarly-compliant wireless communication system that includes a plurality of wireless coverage areas (among other elements of a RAN). Each wireless coverage area typically comprises a BSC, a BTS, and a cell or a sector. The BSC may control more than one BTS, and the BTS may radiate (and receive) in more than one sector; as a functional unit, a BSC and BTS may be considered a base station. For most purposes of the discussion herein, a wireless coverage area may be considered simply to be a cell or a sector, at least in connection with access or service provided to (or potentially provided to) an access terminal. It will be appreciated, however, that there could be distinguishing characteristics between a wireless coverage area, a cell, and a sector.

At step 102, the access terminal determines a signal-to-noise ratio (SNR) measurement of a forward link from a serving wireless coverage area of the plurality of wireless coverage areas. The SNR could be based on a ratio of (i) a transmission power level of a serving signal received from the serving wireless coverage area to (ii) a transmission power level of a contributing signal received concurrently from each of at least one other wireless coverage areas of the plurality.

At step 104, the access terminal receives a message from the wireless communication system with information indicative of a forward-link traffic load of one or more wireless coverage areas of the plurality other than the serving wireless coverage area.

At step 106, the access terminal determines a requested forward-link data rate from the serving wireless coverage area based on both the SNR measurement and the forward-link traffic load of the one or more wireless coverage areas.

Finally, at step 108, the access terminal transmits the requested forward-link data rate to the serving wireless coverage area.

In accordance with the example embodiment, the serving signal received from the serving wireless coverage area could be a pilot signal from a serving sector of the access terminal. Similarly, the contributing signal received concurrently from each of the at least one other wireless coverage area of the plurality could be a respective pilot signal of each of at least one other sector, received concurrently with the pilot signal of the serving sector. The SNR measurement determined at step 102 could then be a ratio of the received power level of the serving pilot signal to a sum of received power levels of the other pilot signals. More particularly, under IS-856, each of the at least one other sectors could be sectors in a neighbor list of the access terminal, and the SNR measurement could correspond to Carrier-to-Interference (C/I) or to Signal to Interference plus Noise (SINR).

Also in accordance with the example embodiment, the message received at step 104 could correspond to a slot-utilization message indicating forward-link traffic-channel timeslot utilization for each given cell and given sector in the neighbor list of the access terminal. As discussed briefly above and described in more detail below, forward-link traffic-channel timeslot utilization is the ratio of timeslots that carry user or control data to all timeslots, including idle ones, within a given time window. As such, timeslot utilization provides measure of load in terms of a sector's forward link capacity for carrying user and/or control data. The slot-utilization message could be a neighbor list message that includes timeslot utilization information associated with each sector in the access terminal's neighbor list.

In further accordance with the example embodiment, the determination by the access terminal at step 106 of a requested forward-link data rate based on both the SNR measurement and the forward-link traffic load of the one or more wireless coverage areas could be made by first determining an initial forward-link data rate based on the SNR measurement, and then modifying the initial rate according to the traffic load. More particularly, the access terminal could use the timeslot utilization of each sector in its neighbor list to determine an average utilization taken over respective forward-link utilizations, as reported in the received neighbor list message (or similar message). The access terminal could then increase the initial forward-link data rate if the average utilization is below a threshold utilization, or instead decrease the initial forward-link data rate if the average utilization is not below the threshold utilization. The access terminal would transmit the modified forward-link data-rate request to the serving sector.

By increasing the initial (SNR-based) determination of requested forward-link data rate when the average timeslot utilization of its neighboring sectors is low (i.e., below the threshold utilization), the access terminal takes advantage of low expected interference from the neighboring sectors' forward traffic channels during times when the access terminal is receiving and decoding its own forward-link traffic from its serving sector. That is, the access terminal requests a forward-link data rate above that which is determined from the SNR measurement alone. Conversely, by decreasing the initial determination of request forward-link data rate when the average timeslot utilization of its neighboring sectors is high (i.e., not below the threshold utilization), the access terminal receives traffic data at a rate more commensurate with higher expected interference from the neighboring sectors' forward traffic channels.

As an alternative to the access terminal determining the average utilization of its neighboring sectors from the information in the received neighbor list message (or similar message), the serving sector (or base station) could make this determination and include it in the neighbor list message. The access terminal could then use the average timeslot utilization supplied in the neighbor list message (or similar message) as a basis to modify the initial determination of request forward-link data rate, without having to first compute the average utilization.

As discussed above, under IS-856, the SNR measurement could correspond to C/I or SINR of the access terminal's serving sector. The determination of the initial forward-link data rate based on the SNR measurement could then correspond to determining a Data Rate Control (DRC) code based on C/I or SINR, whereby the DRC code indicates a requested forward-link data rate. For example, the access terminal could maintain in its memory (e.g., flash or solid state memory) a table of DRC codes and corresponding SINR threshold values, and could consult the table to determine an initial DRC code based on the measured SINR of its serving sector. The initial DRC code would correspond to a requested forward-link data rate based on the SINR measurement alone.

In accordance with the example embodiment, the access terminal could thus increase the initial forward-link data by changing the determined initial DRC code to a code value corresponding to higher requested forward-link data rate if the average timeslot utilization is below the threshold timeslot utilization. Similarly, the access terminal could decrease the initial forward-link data by changing the determined initial DRC code to a code value corresponding to lower requested forward-link data rate if the average timeslot utilization is not below the threshold timeslot utilization. By way of example, the threshold timeslot utilization could be 0.4 (40%), although other values could be used.

Once the modified DRC code is determined, the access terminal could transmit the modified DRC code to its serving sector in a DRC request message. Under IS-856, the serving sector will encode traffic data so as to achieve the requested forward-link data rate.

In further accordance with the example embodiment, the access terminal will monitor a packet error rate (PER) of data packets received from the serving sector (or more generally wireless coverage area). In particular, if the access terminal had requested a higher forward-link data rate based on below-threshold timeslot utilization of its neighboring sectors, and thereafter determines that the PER exceeds a threshold PER, the access terminal will transmit a request for a reduced forward-link data rate. If the access terminal had requested a higher forward-link data rate based on below-threshold timeslot utilization of its neighboring sectors, and thereafter determines that the PER does not exceed the threshold PER, the access terminal will maintain its higher-requested forward-link data rate in subsequent requests to its serving sector.

Conversely, if the access terminal had requested a lower forward-link data rate because the timeslot utilization of its neighboring sectors was not below the utilization threshold, and thereafter determines that the PER is below the threshold PER, the access terminal will transmit a request for an increased forward-link data rate. If the access terminal had requested a lower forward-link data rate because the timeslot utilization of its neighboring sectors was not below the utilization threshold, and thereafter determines that the PER is not below the threshold PER, the access terminal will maintain its lower-requested forward-link data rate in subsequent requests to its serving sector.

It will be appreciated that the PER can be measured within a given time window as a ratio of the number of packets received with unrecoverable errors to the total number of packets received. Under IS-856, a packet received with unrecoverable errors corresponds to a received transmission that the access terminal could not successfully decode into a data packet. Other measures of PER could be defined as well. By way of example, the PER threshold could be 0.01 (1%), although other values could be used. By monitoring the PER and making possible adjustments to the requested forward-link data rate as described above, the access terminal will ensure that the advantageous operation of accounting for timeslot-utilization-based in determining the requested forward-link data rate does not adversely impact the quality of forward-link communications with the serving sector.

Although not explicitly described in the steps of FIG. 1, the base station plays a role by determining the respective forward-link traffic load of each of the wireless coverage areas in the neighbor list of an access terminal, adding information indicative of the respective loads to the neighbor list, and transmitting the neighbor list with the load information to the access terminal. Under IS-856, the base station could comprise a cell or a sector, including one serves the access terminal; and each of the wireless coverage areas in the neighbor list could be a neighboring cell or a neighboring sector. Further, the respective forward-link traffic loads could each be timeslot utilization for each cell or sector. Additionally, the information indicative of the respective loads could be the individual timeslot utilization for each cell or sector, or an average utilization over the respective utilizations.

It will be appreciated that the steps of FIG. 1 are shown by way of example, and that additional and/or alternative steps or alternative ordering of steps could be carried out and still remain within the scope and spirit of the present invention.

Figure 2:
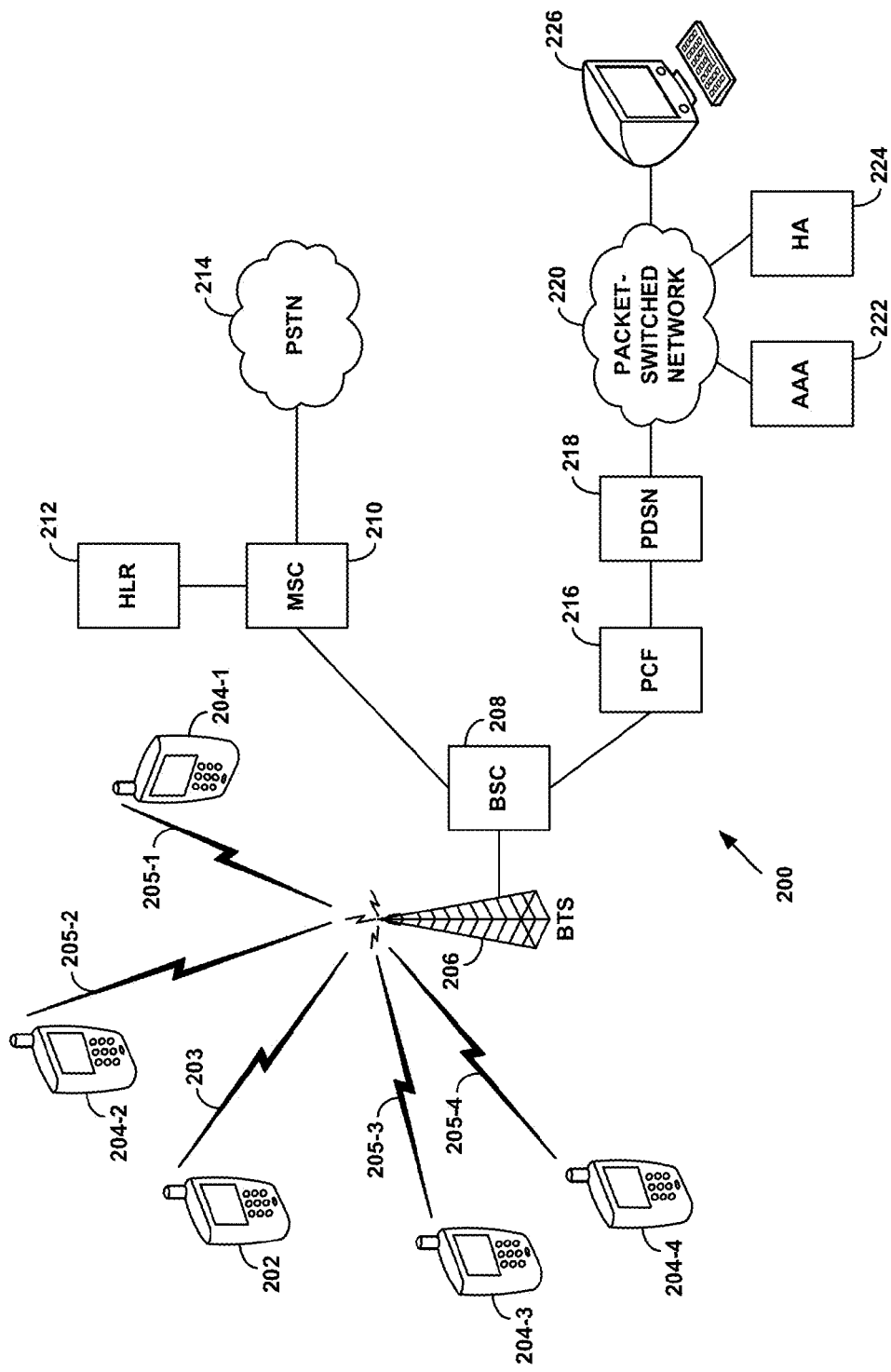
FIG. 2 is a simplified block diagram of a wireless communication system in which an example embodiment of forward-link data-rate request determination based on neighbor load can be employed.

FIG. 2 shows a simplified block diagram of a wireless communication system 200 in which an example embodiment of forward-link data-rate request determination based on neighbor load can be employed. Access terminal AT 202 communicates over an air interface 203 with a BTS 206, which is then coupled or integrated with a BSC 208. Transmissions over air interface 203 from BTS 206 to AT 202 represent the forward link to the access terminal. Transmissions over interface 203 from AT 202 to BTS 206 represent the reverse link. Four other access terminals, AT 204-1, 204-2, 204-3, and 304-4, are also depicted in FIG. 2. As indicated, they communicate with BTS 206 over air interfaces 205-1, 205-2, 205-3, and 205-4, respectively. Each of these air interfaces is operationally similar to air interface 203, each representing at least a forward and reverse link. It will be appreciated that the particular arrangement shown is for purposes of illustration.

BSC 208 is connected to MSC 210, which acts to control assignment of air traffic channels (e.g., over air interface 203, 205-1, 205-2, 205-3, and 205-4), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 220, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as example access terminals 202, 204-1, 204-2, 204-3, and 204-4 typically comprises a user-interface, I/O components, a communication interface, a tone detector, a processing unit, and data storage, all of which may be coupled together by a system bus or other mechanism. As such, system 200, ATs 202, 204-1, 204-2, 204-3, and 204-4, and air interfaces 203, 205-1, 205-2, 205-3, and 205-4 collectively are representative of example means of implementing and carrying out the various functions, steps, and procedures described herein.

Figure 3:
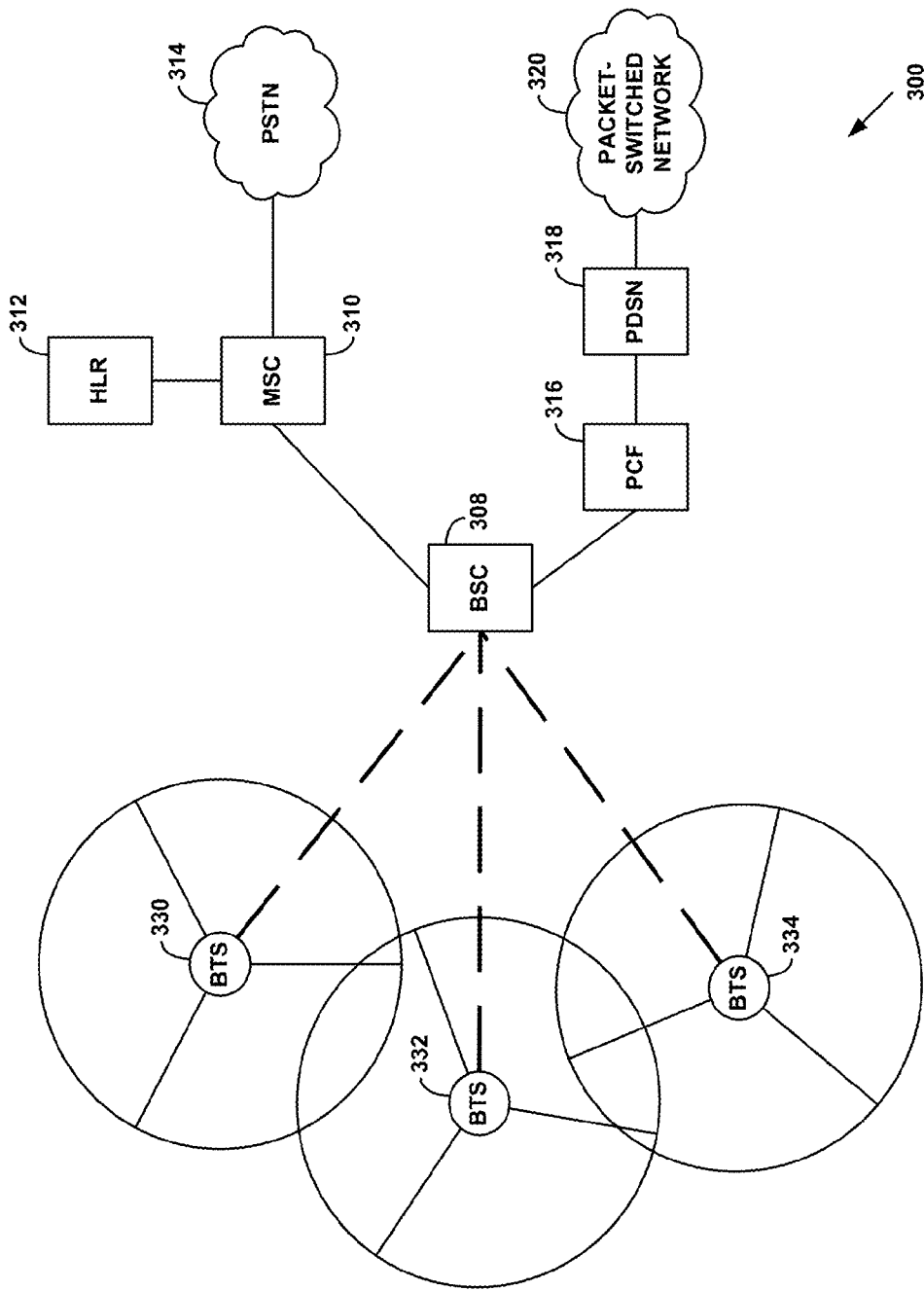
FIG. 3 is a simplified block diagram a wireless communication system illustrating multiple sectors, and in which an example embodiment of forward-link data-rate request determination based on neighbor load can be employed.

In practice, a BSC may serve multiple BTSs, each of which may then radiate to define a given cell and a plurality of cell sectors. This arrangement is illustrated in FIG. 3, which shows BSC 308 in network 300 coupled with three BTSs 330, 332, and 334 (for the sake of brevity, access terminals, the AAA server, and the HA are omitted from this figure). Each BTS is shown at the core of a respective circle representing a cell, and each cell is divided into three pie-pieces representing sectors. With this arrangement, an access terminal can operate in any of the sectors and can connect, via a serving BTS, with MSC 310 for circuit-based services in the wireless communication system and beyond (e.g., in PSTN 314). Through its serving sector, an access terminal can also communicate, via PCF 316 and PDSN 318, on packet network 320. Note that the depiction of three wireless services sectors for each of the BTSs in FIG. 3 is illustrative, and other numbers of sectors per BTS are possible. Further, the relative positions of the BTSs and the relative angular orientations of the sectors are also illustrative, and other arrangements may be used.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other neighboring sectors, which may vary as the AT moves about within the wireless communication system, or as other factors cause the AT's RF conditions to change. More particularly, the AT monitors SINR of each of active set and neighboring sectors, and reports its measurements to the serving base station, which then directs the AT to update its active set in accordance with the reported strengths and one or more threshold conditions.

Operationally, an IS-2000 system is arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates soft handoff between sectors, as described above. A soft handoff between sectors the same BTS is referred to as a "softer handoff."

With the arrangement described above, an access terminal can engage in cellular voice and/or in packet-data communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set and a neighbor list as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into timeslots of length 2048 chips each. At a chip rate of 1.228 Mega-chips per second, each slot has a duration of 1.67 milliseconds (ms), or a rate of 600 timeslots per second. Every 16 slots comprise a frame, corresponding to 26.67 ms per frame, and frame boundaries are synchronous across all sectors of a RAN.

Each timeslot is further divided into two 1024-chip half-slots, each half-slot arranged to carry a 96-chip pilot burst (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each timeslot (800 per half-slot) are allocated for a forward traffic channel or a forward control channel, so that any given timeslot will carry either AT-specific traffic-channel data (if any exists) or AT-specific control-channel data. While the 1600 chips of forward-link traffic and/or control channel data of any given timeslot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. More specifically, in maintaining its active set, the AT continually monitors the pilot signal from each sector in its active set to determine which has the best RF conditions on its forward link. The quality of the RF conditions on a forward link is measured in terms of SINR (or a similar metric), and the selected sector is designated the AT's "serving sector." In conventional operation, the AT determines the supportable data rate on the forward link by using the measured SINR of its serving sector to select one of several pre-determined data rates in a look-up table stored in the AT's memory, for instance. The AT then transmits a request for the selected data rate in a DRC message on the AT's reverse-link DRC sub-channel to its serving sector.

The IS-856 reverse link also includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; under Rel. 0, an AT can achieve a maximum reverse-link burst rate of 153.6 kilobits per second (kbps), while under Rev. A, an AT achieve a maximum reverse-link burst rate of 1.8 Megabits per second (Mbps).

Operation in an IS-856 compliant communication system may be illustrated, again with reference to FIG. 2. To acquire packet data connectivity under IS-856, after an access terminal first detects an EVDO carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

3. Adapting Requested Forward-Link Data Rate to Neighbor Load

In an EVDO communication session (i.e., under IS-856), user data are transmitted to an AT on the forward link using a TDM scheme, as described above. The user data are first encoded into data packets, and the packets are transmitted during specific timeslots allocated for transmissions to that AT. The AT recovers the user data by decoding each time-slot transmission it receives on its forward link from the base station. Since each timeslot is of equal duration (e.g., 1.67 ms under IS-856), the forward-link data rate depends on the amount or the density of data that are transmitted during each timeslot, which in turn is determined by the particular encoding scheme used. Hence, different forward-link data rates are achieved by using different encoding schemes, and thus the number of timeslots required to transmit a given encoded data packet depends on the encoding scheme used to generate the given data packet.

As described above, under IS-856 a base station (or sector) broadcasts two pilot bursts and a MAC channel during every timeslot, as well as any encoded data awaiting transmission. However, the base station may not at every instant have user data to transmit. Consequently, at various times some number of a base station's timeslot transmissions may be empty with respect to encoded user data. A timeslot corresponding to a transmission containing no encoded packet data is referred to an "idle" timeslot. Conversely, a non-idle timeslot is one during which a transmission does contain encoded packet data. The ratio of the number of non-idle timeslots during a given time window to the total number of timeslots (idle plus non-idle) during the given window is referred to as the timeslot utilization, and is a fraction in the range [0, 1].

Figure 4:
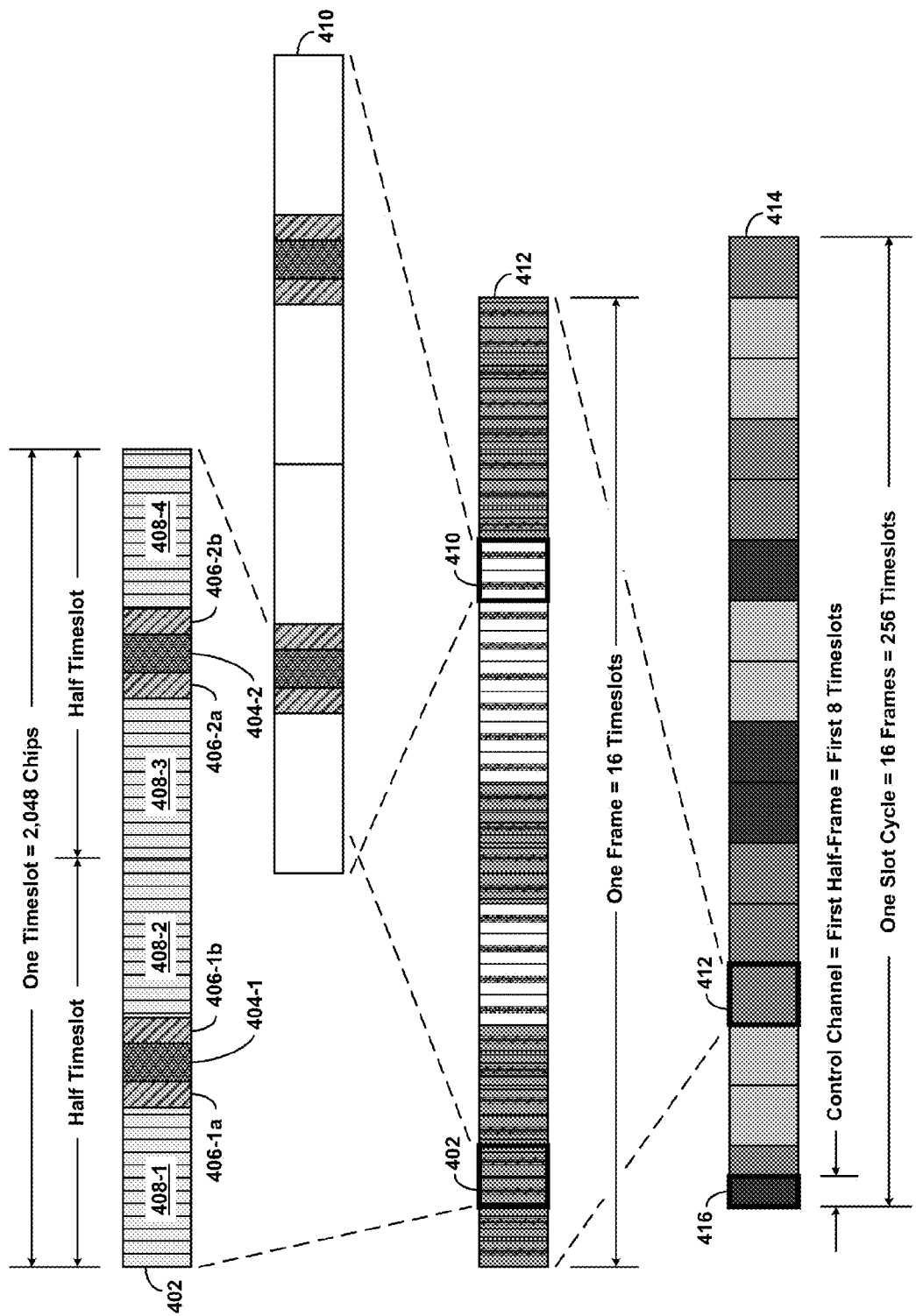
FIG. 4 illustrates the logical structure of timeslots, frames, and slot cycles, and the organizational relationship between the three.

FIG. 4 illustrates the structure of EVDO timeslots for both the idle and non-idle cases, and further illustrates the organizational relationship between timeslots, frames, and slot cycles. A non-idle timeslot 402 is shown at the top of the figure. As indicated, the timeslot 402 has 2,048 chips spanning two half timeslots of 1,024 chips each. Each half timeslot has a 96-chip pilot burst at its center, labeled 404-1 and 404-2, and a MAC channel sandwiching the pilot burst in two 64-bit segments (406-1*a* and 406-1*b* on either side of pilot burst 404-1, and 406-2*a* and 406-2*b* on either side of pilot burst 404-2). After accounting for the pilot burst and the two MAC channel segments, each half timeslot has two 400-chip segments remaining for control-channel or traffic-channel data. These are labeled 408-1 and 408-2 in the first half timeslot, and 408-3 and 408-4 in the second half timeslot.

Under IS-856, the pilot burst encodes a data symbol of zero, covered with the PN offset of the transmitting sector. The MAC channel carries sub-channels (Reverse Activity, Reverse Power Control, and DRCLock) for controlling AT power and rate on the AT's reverse channel to the sector. The MAC sub-channels are code-division multiplexed within the single MAC channel. All of the 1,600 data chips of a given timeslot are either dedicated for traffic-channel data for specific user (i.e., the specific user's AT), or for control-channel data, such as pages and system control messages.

FIG. 4 also depicts an idle timeslot 410. As shown, the idle timeslot also has two half timeslots, each with a pilot burst and two sandwiching MAC channels segments. In the case of an idle slot, however, the data chips are "empty." More specifically, since the sector has no traffic or control data to transmit during an idle timeslot, sector's forward link power is zero during the data portions of the idle timeslot. The sector does still broadcast its pilot burst and MAC channel during an idle timeslot.

Transmissions are further organized in frames, each containing 16 timeslots, as illustrated by frame 412 in FIG. 4. By way of example, non-idle timeslot 402 and idle timeslot 410 are both included in the frame 412; the dashed lines from each of timeslots 402 and 410 indicate their relative positions within the frame. As also illustrated, there may be a mix of non-idle and idle timeslots in a frame. Accordingly, one measure of timeslot utilization could be determined over one transmission frame as the number of non-idle timeslots in the frame divided by 16. It will be appreciated that timeslot utilization could be determined over other time windows as well.

As further illustrated in FIG. 4, transmissions are still further organized in 16-frame slot cycles, depicted as slot cycle 414 in the figure. By way of example, frame 412 is included in the slot cycle 414; the dashed lines from the frame 412 indicate is relative position within the slot cycle. Under IS-856, the eight timeslots of the first half-frame of a slot cycle are reserved for control-channel data. The remaining 15½ frames are available for traffic-channel data to one or more users (i.e., one or more ATs). For purposes of illustrations, the frames in the slot cycle 414 are depicted in different shades are gray in order to represent different timeslot utilizations in each frame. Note that timeslot utilization could also be computed across the 16 frames of a slot cycle; and again other time windows could be used.

a. Operating Principles

Under IS-856, an access terminal determines SINR of its serving sector from the pilot bursts of its serving sector and those of other nearby sectors (e.g., in the AT's active set and/or its neighbor list). The power level of the pilot signal of a given sector is usually specified as a gain level, x, according to the relation x dBm=10 $\log_{10}$(P/1 mW), where P is the power in mW (milliwatts). However, other power units could be specified. Measured in dBm, gain expresses a logarithmic ratio of power P to a fixed power level of 1 mW. As a relative level, SINR of the given sector is then expressed in dB. For example, SINR=+3 dB would correspond to a pilot channel power twice that of the noise and interference from other detectable pilot signals. Similarly, SINR=+6 dB would correspond to a pilot channel power four times that of the noise and interference from other detectable pilot signals.

In conventional operation, AT determines a forward-link data rate to request from its serving sector based on the determined SINR. In practice, AT can maintain a table or other data structure that contains a correlation of preconfigured SINR threshold values with corresponding preconfigured forward-link data rates. For a given measured SINR, the AT can perform a table look-up to determine a forward-link data rate. Each preconfigured forward-link data rate is represented in the table by a DRC code or symbol, rather than by an actual numerical data rate.

The AT transmits the determined DRC code to its serving sector in a DRC request message. The serving sector honors the AT's request by encoding data at the requested rate and populating the encoded data in the traffic-channel portion of each of one or more timeslots on the forward link to the AT. Since every timeslot is of the same fixed duration (e.g., 1.67 ms), and every frame has the same number of timeslots (e.g., 16), different data rates are achieved by encoding different amounts of data within the same fixed amount of time. Thus, a higher data rate is achieved by encoding a higher density of data in each timeslot, and vice versa. Upon receiving forward-link transmissions, the AT decodes the traffic-channel data during the data portion of each received timeslot transmission. The ability of the AT to successfully decode the received transmissions depends, at least in part, on the AT having requested a data rate appropriate to the RF conditions, which the AT does conventionally based only on SINR.

An example of preconfigured SINR thresholds and forward-link data rates is illustrated in FIG. 5, which presents a Table 500 having four columns. Column 502 lists SINR threshold values in dB in increasing order; column 504 lists the corresponding DRC codes; column 506 lists the corresponding numerical data rates; and column 508 lists number of timeslots required for transmitting a packet at the corresponding data rate and DRC code. In practice, an AT would not necessarily store columns 506 and 508, since it only needs to determine a DRC code for a given measured SINR. However, these two columns illustrate how different encoding schemes achieve different data rates over fixed-length timeslots.

The SINR thresholds in column 502 are applied as upper limits, such that the AT determines the smallest SINR threshold value that is greater than (but not equal to) a given measured SINR, and selects the preconfigured DRC code corresponding with the determined largest SINR threshold value. For example, for a measured SINR of −3.2 dB, the AT would determine the smallest SINR threshold value larger than the measured one to be −2.8 dB, corresponding to a DRC code of 3 and a forward-link data rate of 153.6 kbps. The AT would transmit the DRC code in a DRC request message, encoded into a four-bit "DRC symbol." The AT would also include the PN offset of the serving base station (or sector) in the DRC request. The serving base station would respond to the DRC request message by transmitting data on the forward link to the AT at the requested rate. In doing so, the serving base station would use a look-up table (or other recorded data structure) having the same mapping of DRC codes to forward-link data rates as Table 500 to interpret the received DRC request.

Timeslot transmissions are synchronized across all sectors, so all pilot bursts detectable by a given AT will be detected nearly synchronously (deviations from strict synchronous detection may arise due to possibly different propagation delays between the AT and the detectable sectors). Similarly, the data portions of timeslot transmissions also arrive at the AT nearly synchronously (deviations again being due to possibly different propagation delays). However, while every timeslot transmission contains two pilot bursts used by the AT to determine SINR (among other purposes), not every timeslot transmission carries data; i.e., some may be idle timeslots. Consequently, the actual amount of interference present at the AT during data decoding will not necessarily be correlated with the SINR measurement used by the AT to determine the requested data rate. This is because the SINR measurement relies only on the pilot-burst portion of timeslot transmissions, while during the data portion of an idle timeslot, the forward-link transmission power is zero.

Figure 6:
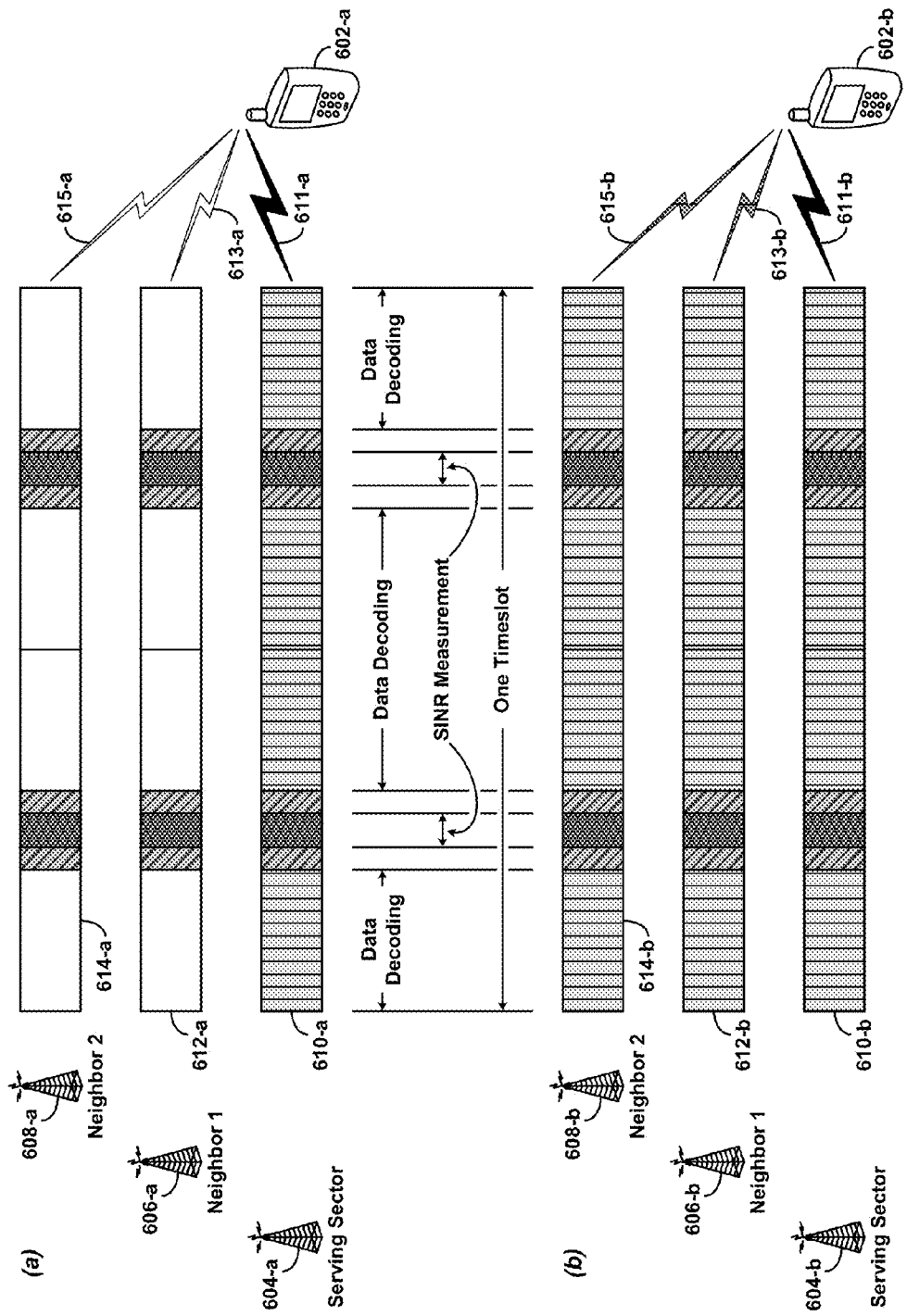
FIG. 6 illustrates the timing of SNR measurement and data decoding for timeslots received simultaneously at an access terminal from a serving sector and two neighboring sectors, for the case of relatively light loading of the neighbors (a) and the case of relatively heavy loading of the neighbors (b).

FIG. 6 illustrates the possibly suboptimal correlation between an AT's measurement of SINR and the actual amount of interference the AT may experience due to the data portions of neighboring timeslot transmissions. In the top portion of the figure (labeled "(a)"), an AT 602-a is served by a serving sector 604-a via an air interface 611-a. The AT 602-a can also detect neighbor 1 sector 606-a via air interface 613-a, and neighbor 2 sector 608-a via air interface 615-a.

Three synchronous timeslot transmissions to the AT 602-a, one from each sector, are depicted: timeslot transmission 610-a from serving sector 604-a, timeslot transmission 612-a from neighbor 1 sector 606-a, and timeslot transmission 614-a from neighbor 2 sector 608-a. As represented by the gray shading and vertical hatched lines, the data portion of timeslot transmission 610-a is populated with data for the AT 602-a; the solid black of the lightening-bolt line representing the air interface 611-a indicates that data are present on the air interface during the data portion of the timeslot transmission. By way of example, each of timeslot transmissions 612-a and 614-a are idle. This is represented by the absence of shading and vertical hatched lines in the data portions of each of these two timeslots. As a consequence, there is no transmission power on either of air interfaces 613-a or 615-a during the data portions of the respective timeslot transmissions (612-a and 614-a), as indicated by the white fill of the lightening-bolt lines representing the air interfaces 613-a or 615-a.

For the situation illustrated in the top (a) portion of FIG. 6, the SINR measurement made by the AT 602-a during the pilot-burst portions of the three timeslot transmission (and as indicated in the figure) may correspond to DRC code that underestimates the data rate that the AT could actually decode. This is because the AT will not observe any interfering transmission power from the neighboring sectors during the data-decoding portion of the timeslot transmissions (also indicated in the figure).

A different situation is depicted in the bottom portion of the figure (labeled "(b)"), where the same access terminal, now labeled AT 602-b, is served by the same serving sector, now labeled 604-b, via the same air interface, now labeled air interface 611-b. The AT 602-b can also detect neighbor 1 sector 606-b via air interface 613-b, and neighbor 2 sector 608-b via air interface 615-b. By way of example, the timeslot transmission 610-b from serving sector 604-b again carries data in the data portion of the timeslot. However, now both timeslot transmission 612-b from neighbor 1 sector 606-b and timeslot transmission 614-b from neighbor 2 sector 608-b also carry data during the respective data portions of each timeslot. The lightening-bolt lines representing the air interfaces 613-b or 615-b are both shaded gray and have hatched line, indicating some degree of interference at the AT 602-b during the data-decoding of the timeslot transmission 610-b.

In this instance, the SINR measurement made by the AT 602-b during the pilot-burst portions of the three timeslot transmission may correspond to DRC code that overestimates the data rate that the AT could actually decode. This is because the AT's SINR determination will not account for the interfering data transmissions from the neighboring sectors during the data-decoding portion of the timeslot transmissions.

By relying solely on SINR (or some other measure of SNR) to determine the requested forward-link data rate, conventional operation omits information that could lead to a data rate that is more accurately correlated with the RF condition under which the AT will actually decode data. More particularly, example embodiments herein advantageously incorporate information indicative of forward-link traffic load of neighboring sectors to enable the AT to better determine a requested forward-link data rate.

b. Using Neighbor Load to Adjust Requested Forward-Link Data Rate

In accordance with the example embodiment, the RAN (or an appropriate RAN element) will monitor the forward-link timeslot utilization of the cells and/or sectors under its control, and will provide various forms of the utilization information to access terminals being served by one or another of the cells and/or sectors. For example, the RAN can filter the timeslot utilization information so that any given AT will receive information related only to the sectors in its neighbor list. The AT can then use the information to adjust its requested forward-link data rate.

Figure 7:
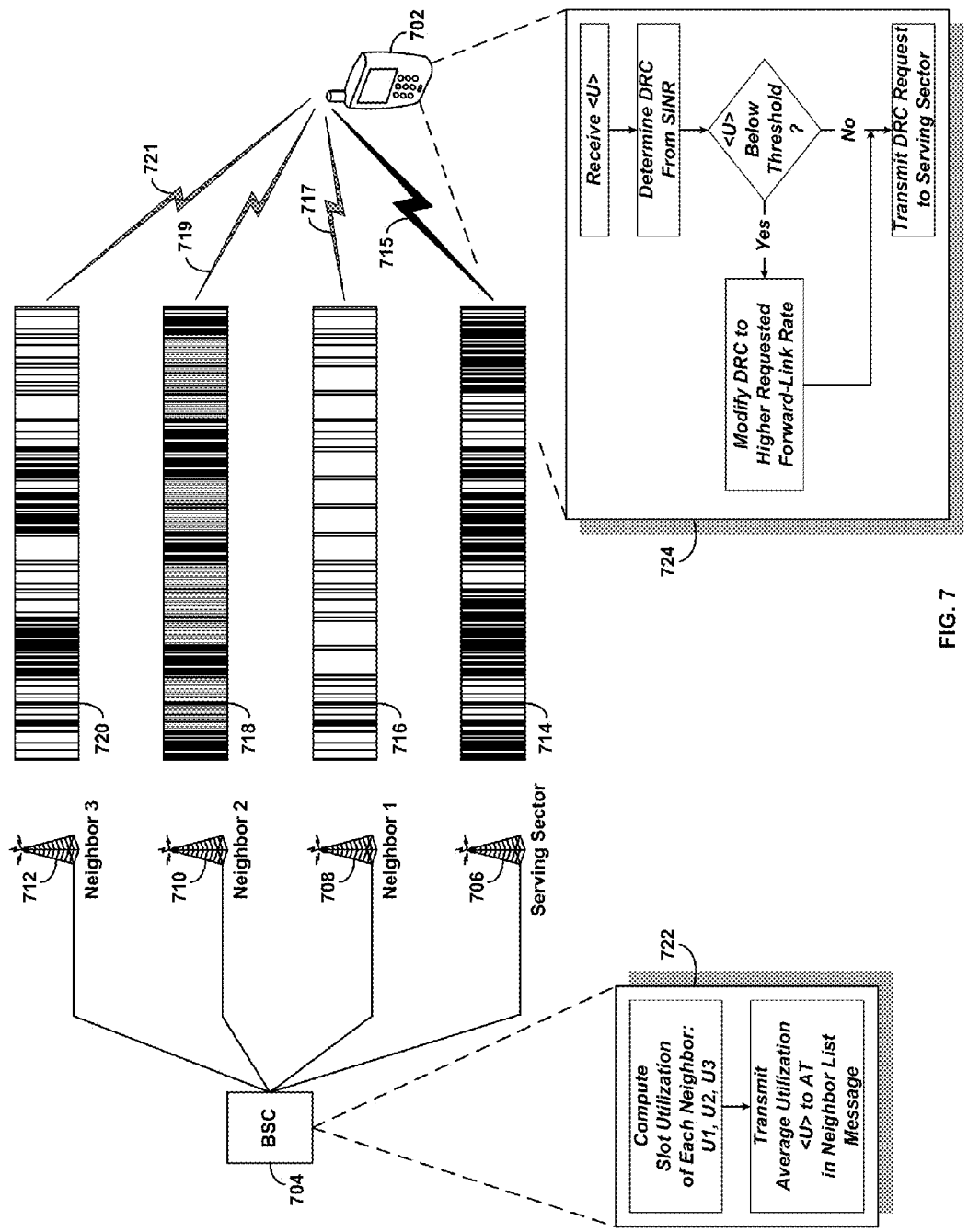
FIG. 7 illustrates example operation of forward-link data-rate request determination based on neighbor load.

FIG. 7 illustrates operation of the example embodiment for a representative case. In the figure, an AT 702 is served by a serving sector 706 via an air interface 715. The AT 702 can also detect neighbor 1 sector 708 via air interface 717, neighbor 2 sector 710 via air interface 719, and neighbor 3 sector 712 via air interface 721. By way of example, all four sectors are under the control of a BSC 704.

For purposes of illustration, four synchronous slot cycle transmissions, one from each sector, are depicted: slot cycle transmission 714 from serving sector 706, slot cycle transmission 716 from neighbor 1 sector 708, slot cycle transmission 718 from neighbor 1 sector 710, and slot cycle transmission 720 from neighbor 3 sector 712. Timeslot utilizations within each slot cycle are represented by the density of vertical black bands. Evidently (and by way of example), the slot cycle 718 appears to have the highest timeslot utilization, while the slot cycle 716 appears to have the lowest timeslot utilization. The timeslot utilizations of the slot cycles 714 and 720 appear to lie somewhere between those of slot cycles 716 and 718. It should be understood that the timeslot utilizations are represented qualitatively in the figure for the purposes of the present discussion.

The solid black of the lightening-bolt line representing the air interface 715 indicates the presence of data on the air interface during at least some portion of the slot cycle 714. The presence of interference detected during the slot cycle by the AT 702 from each of the neighboring sectors 708, 710, and 712 is indicated by the gray shading and hatched lines within each of the lightening-bolt lines representing the air interfaces respective air interfaces 717, 719, and 721. Note that there could be simultaneous idle timeslots from all three of the neighboring sectors at one or more times within the depicted slot cycles. However, the average timeslot utilization taken over the three neighboring sectors provides a statistical measure of the likelihood of such an absence of interference. Conversely, the average timeslot utilization can be considered as providing a statistical measure of the expected degree of interference. It will be appreciated timeslot utilization could be determined over other time windows besides slot cycles.

In accordance with the example embodiment, the BSC 704 will monitor the timeslot utilizations of each of the cells and/or sectors under its control, including (in the present example) sectors 706, 708, 710, and 712. Under IS-856, the BSC (or other RAN element) will be aware of the active sets and neighbor lists of access terminals being served by the cells and/or sectors under its control. Hence, in addition to knowing that the AT 702 is being served by sector 706, the BSC 704 will also be aware that the sectors 708, 710, and 712 are neighboring sectors of the AT 702. Let the utilizations of the neighboring sectors 708, 710, and 712 be U1, U2, and U3, respectively. The BSC 704 will periodically compute an average utilization <U>, and, via the serving sector 706, transmit <U> in a message to the AT 702. For example, the BSC could transmit <U> in a neighbor list message. This process is represented in an abbreviated form as logical steps 722 in FIG. 7, and would be duplicated for each access terminal being served by the BSC via cells and/or sectors under the BSC's control (each such access terminal might have a different active set and neighbor list).

In further accordance with the example embodiment, the AT 702 will use <U> as received from its serving sector to possibly modify its requested forward-link data rate. More particularly, the AT 702 will first determine an initial DRC code base on SINR of the serving sector 706. For example, the AT can consult a table such the one shown in FIG. 5 to determine a data rate and corresponding DRC code. The AT will then compare <U> with a threshold utilization; if <U> is below the threshold, the AT will modify the initial DRC code to a value corresponding to a higher data rate. If <U> is not below the threshold, the AT will retain the initial DRC code. The AT will then transmit the DRC code in a DRC request message to its serving sector 706. This process is represented in an abbreviated form as logical steps 724 in FIG. 7.

As an example, if the AT 702 a measured SINR of –3.2 dB, the AT would determine the smallest SINR threshold value larger than the measured one to be –2.8 dB, corresponding to a DRC code of 3 and a forward-link data rate of 153.6 kbps. If the AT then determined that <U> was below the threshold utilization, the AT could select a rate of 407.2 kbps, corresponding to a DRC code of 4. The AT would thus transmit this DRC code to its serving sector, an in turn receive data at the higher rate of 407.2 kbps. The AT can achieve this higher rate because the threshold test would have indicated that, statistically, there will be acceptably-low interference from the neighboring sectors during the data portions of timeslot transmissions to the AT. If the AT had instead determined that <U> was not below the threshold utilization, the AT would have retained the rate of 153.6 kbps and the corresponding DRC code of 3.

The average utilization <U> could be determined as a simple numerical average of the utilizations U1, U2, and U3 of the neighboring sectors 708, 710, and 712. As a possible alternative, the average utilization could be weight according to the level at which each sector is detected by the AT 702. For instance, for a higher weight could be given to a sector whose pilot burst is more strongly detected by the AT, and vice versa. Other weighting schemes could be applied to the average utilization as well. Further, instead of transmitting <U>, the BSC could transmit (via the serving sector 706) just the utilizations U1, U2, and U3. The AT 702 itself could then compute the average utilization <U>.

The threshold utilization used in the threshold test could be supplied to the AT in one or another system message. An example value for the threshold utilization is 0.4 (40%), although other values could be used. Moreover, depending on the initial DRC code determined from SINR of the serving sector, there could be different threshold utilization values. For example, for a DRC code of 3, the threshold utilization could be 0.4, while for a DRC code of 8, the threshold utilization could be 0.25. Other values are possible as well.

In still further accordance with the example embodiment, AT will monitor a packet error rate (PER) of data packets received on the forward link from the base station. If the AT had modified an initial DRC code to request an increased forward-link data rate because <U> was below the threshold utilization, and then determines that the PER exceeds a threshold PER, the AT will modify its DRC code to request a lower forward-link data rate. If the AT had modified an initial DRC code to request an increased forward-link data rate, and then determines that the PER does not exceed the threshold PER, the AT will retain its DRC code to continue requesting the increased forward-link data rate.

Alternatively, if the AT had retained an initial DRC code because <U> was not below the threshold utilization, and then determines that the PER does not exceed the threshold PER, the AT will modify its DRC code to request a higher forward-link data rate. If the AT had retained the initial DRC code, and then determines that the PER does exceed the threshold PER, the AT will retain its DRC code to continue requesting the SINR-based forward-link data rate.

By incorporating the PER monitoring, the access terminal can further advantageously tune its forward-link data-rate requests to its current RF conditions. Accordingly, access terminals can achieve the highest possible forward-link data rates, while still maintaining reliable decoding of data.

4. Implementation of Example Embodiment

As described above, the example embodiment involves actions and operations carried out by both the access terminal and the base station (or sector). As such, the example embodiment may be considered as comprising a "client-side," associated with the access terminal (or other client communication device), and a "system-side," associated with the base station (or sector, or other RAN element). The example embodiment can be implemented as executable steps and operations of a client-side method carried out by an access terminal, and as executable steps and operations of a system-side method carried out by a base station (or BTS cell or sector).

Implementation of the example embodiment can further be considered as including means for carrying out both the client-side method and the system-side method. An example implementation of both the client-side method and means and the system-side method and means is described below. By way of example, both the access terminal and the base station are taken to be configured to operate according to IS-856 in a similarly-compliant wireless communication system, such as the one described above in connection with FIG. 2.

a. Example Method Implementation in an Access Terminal

Figure 8:
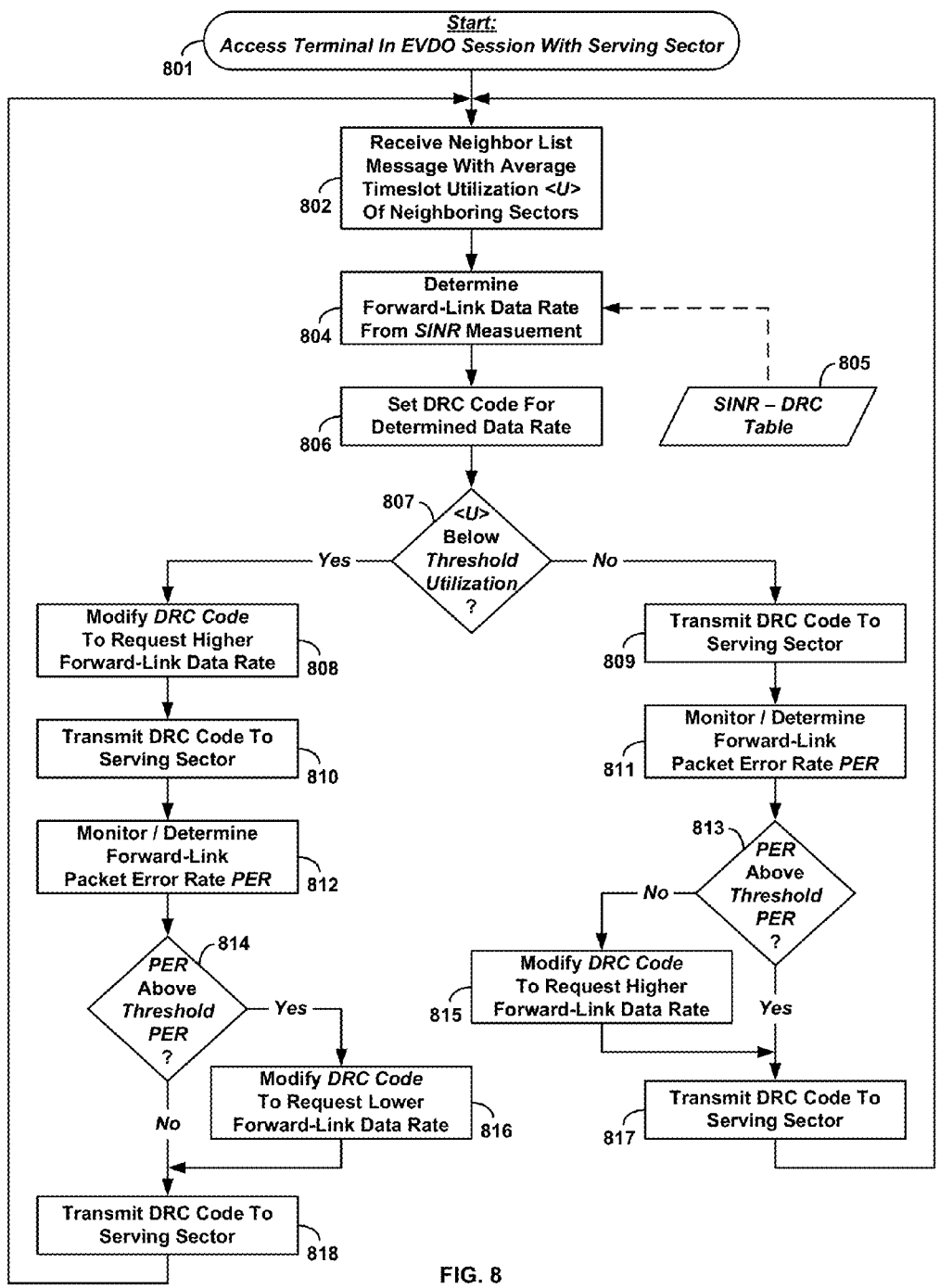
FIG. 8 illustrates an example embodiment of logical steps for implementing in an access terminal a method of forward-link data-rate request determination based on neighbor load.

FIG. 8 is a logical flowchart representing executable steps and operations that could be carried out by an access terminal to implement an example client-side method of forward-link data-rate request determination based on neighbor load. The illustrated steps could be implemented in an AT (or similar device) as executable instructions stored in the memory of the AT and executed by one or more processors of the AT. The executable instructions could also be stored on some form of non-transitory tangible computer readable storage medium, such as magnetic or optical disk, or the like, and provided for transfer to the AT's memory during configuration or other step(s) for preparing the AT for operation.

By way of example, the AT is taken to be initially in an active EVDO session in a serving sector. This is indicated at the start step 801. At step 802, the AT receives a neighbor list message from the serving sector containing an average timeslot utilization <U> of the AT neighboring sectors. This could be the average utilization as described above.

At step 804 the AT determines an initial forward-link data rate from the SINR of its serving sector. The AT could make this determination by consulting a SINR-DRC table 805, as indicated by the dashed arrow from the table to step 804. The SINR-DRC table 805 could correspond to table 500 in FIG. 5, for example, and be stored in the AT's memory. At step 806, the AT sets an initial DRC code according to the determination made at step 804.

At step 807, the AT compares <U> with a threshold utilization. If <U> is below the threshold utilization ("Yes" branch from step 807), the AT modifies the DRC code determined at step 806 so as to indicate a higher requested forward-link data rate. The AT then transmits the modified DRC code in a DRC request message to its serving sector at step 810. The AT can then expect to receive data on its forward link at the increased data rate requested in its DRC request message.

At step 812, the AT monitors the PER on its forward link, and at step 814 the AT compares PER to a threshold PER. If PER is above the threshold ("Yes" branch from step 814), the AT modifies the DRC code transmitted at step 810 to request a lower forward-link data rate. The AT then transmits the (now-modified) DRC code at step 818. The process then returns to step 802.

If, at step 814, PER is not above the threshold ("No" branch from step 814), the AT continues (at step 818) to transmit the unmodified DRC code transmitted at step 810 to request the increased forward-link data rate. The process then returns to step 802.

If, at step 807, <U> is not below the threshold utilization ("No" branch from step 807), the AT retains the DRC code determined at step 806. The AT then transmits the retained DRC code in a DRC request message to its serving sector at step 809. The AT can then expect to receive data on its forward link at the retained data rate requested in its DRC request message.

At step 811, the AT monitors the PER on its forward link, and at step 813 the AT compares PER to a threshold PER. If PER is not above the threshold ("No" branch from step 813), the AT modifies the DRC code transmitted at step 809 to request a higher forward-link data rate. The AT then transmits the (now-modified) DRC code at step 817. The process then returns to step 802.

If, at step 813, PER is above the threshold ("Yes" branch from step 814), the AT continues (at step 817) to transmit the unmodified DRC code transmitted at step 809 to request the initial forward-link data rate. The process then returns to step 802.

It will be appreciated that the steps shown in FIG. 8 are meant to illustrate operation of an example embodiment. In addition, various steps could be altered or modified, the ordering of certain steps could be changed, and additional steps could be added, while still achieving the overall desired operation.

b. Example Method Implementation in a Base Station

Figure 9:
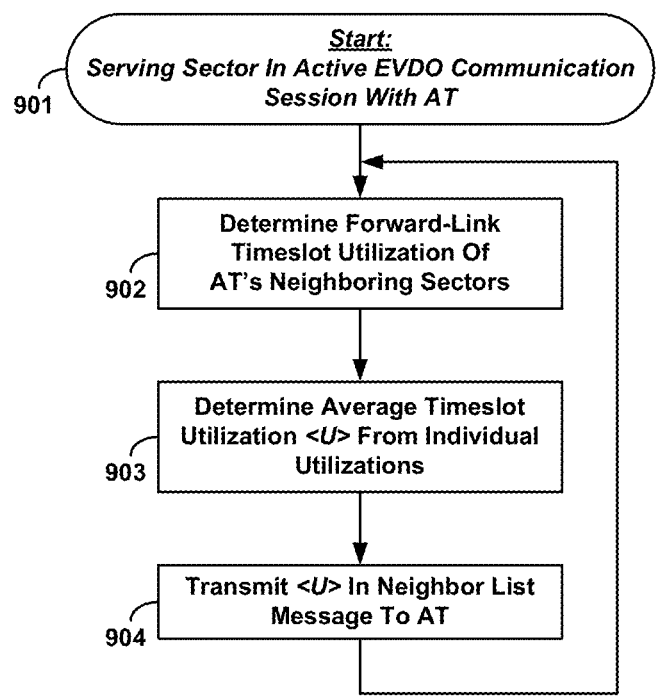
FIG. 9 illustrates an example embodiment of logical steps for implementing in a base station a method of forward-link data-rate request determination based on neighbor load.

FIG. 9 is a logical flowchart representing executable steps and operations that could be carried out by base station to implement an example system-side method of forward-link data-rate request determination based on neighbor load. The illustrated steps could be implemented in a base station, BTS (or other RAN element) as executable instructions stored in the memory of the base station and executed by one or more processors of the base station. The executable instructions could also be stored on some form of non-transitory tangible computer readable storage medium, such as magnetic or optical disk, or the like, and provided for transfer to the base station's memory during configuration or other step(s) for preparing the base station for operation.

At the start 901, the base station, referred to in the figure as a Serving Sector, is engaged active EVDO data sessions with an access terminal. At step 902, the base station determines the forward-link timeslot utilization of the sectors in the AT's neighbor list.

At step 904, the base station determines an average timeslot utilization <U> from the utilizations determined at step 902. At step 904, the base station transmits <U> in a neighbor list message to the AT. The process then returns to step 902, where it repeats for the duration of the active EVDO session.

It will be appreciated that the steps shown in FIG. 9 are meant to illustrate operation of an example embodiment. As such, various steps could be altered or modified, the ordering of certain steps could be changed, and additional steps could be added, while still achieving the overall desired operation.

c. Example Access Terminal

Figure 10:
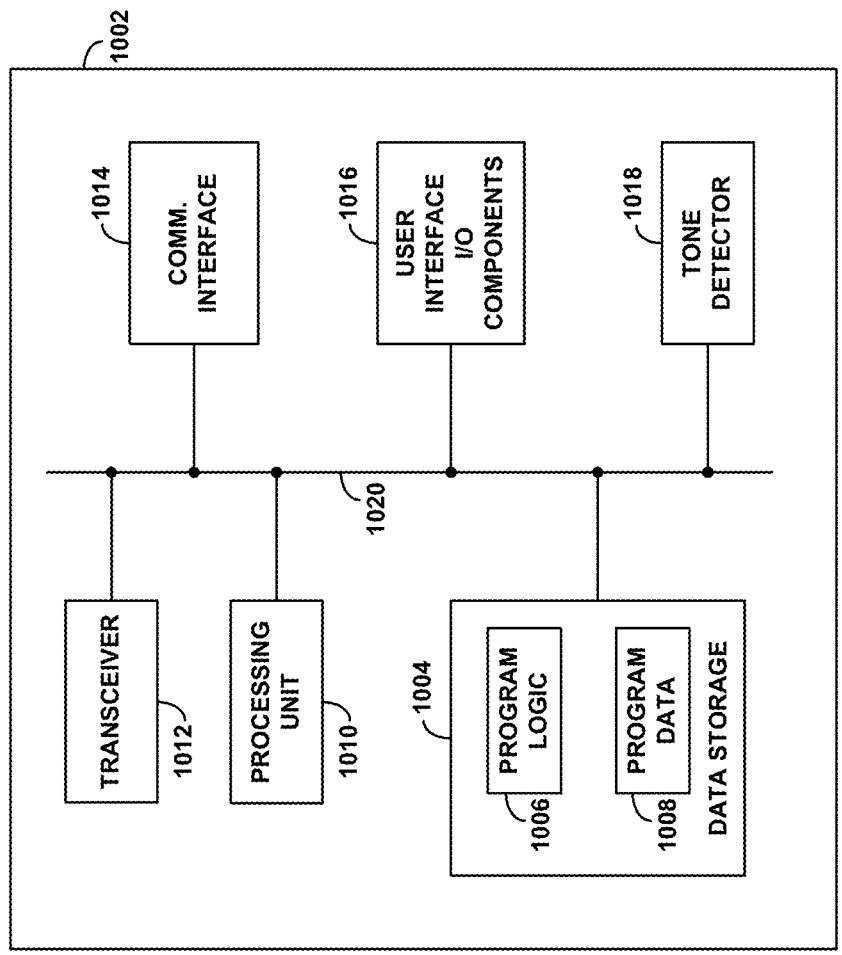
FIG. 10 is a block diagram of an example access terminal in which forward-link data-rate request determination based on neighbor load may be implemented.

FIG. 10 is a simplified block diagram depicting functional components of an example access terminal 1002 in which client-side operation of forward-link data-rate request determination based on neighbor load may be implemented. The example AT 1002 could be a cell phone, a personal digital assistant (PDA), a pager, a wired or wirelessly-equipped notebook computer, or any other sort of device. As shown in FIG. 10, the example AT 1002 includes data storage 1004, processing unit 1010, transceiver 1012, communication interface 1014, user-interface I/O components 1016, and tone detector 1018, all of which may be coupled together by a system bus 1020 or other mechanism.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of AT 1002 relevant to synchronized determination of rate control are discussed briefly below.

Communication interface 1014 in combination with transceiver 1012, which may include one or more antennas, enables communication with the network, including reception of slot-utilization messages from the serving base station, as well as support for other forward and reverse link channels. The communication interface may include a module, such as an MSMT™-series chipset made by Qualcomm Inc. of San Diego, Calif., and supports wireless packet-data communications according to a CDMA family of protocols.

Processing unit 1010 comprises one or more general-purpose processors (e.g., INTEL microprocessors) and/or one or more special-purpose processors (e.g., dedicated digital signal processor, application specific integrated circuit, etc.). In turn, the data storage 1004 comprises one or more volatile and/or non-volatile storage components, such as magnetic or optical memory or disk storage. Data storage 1004 can be integrated in whole or in part with processing unit 1010, as cache memory or registers for instance. In example AT 1002, as shown, data storage 1004 is configured to hold both program logic 1006 and program data 1008.

Program logic 1006 may comprise machine language instructions that define routines executable by processing unit 1010 to carry out various functions described herein. In particular the program logic, communication interface, and transceiver may operate cooperatively to carry out logical operation such as that discussed above and illustrated in FIG. 8.

It will be appreciated that there can be numerous specific implementations of an access terminal, such as AT 1002, in which the client-side method of forward-link data-rate request determination based on neighbor load could be implemented. Further, one of skill in the art would understand how to devise and build such an implementation. As such, AT 1002 is representative of means for carrying out the client-side method of forward-link data-rate request determination based on neighbor load, in accordance with the methods and steps described herein by way of example.

d. Example Base Station

Figure 11:
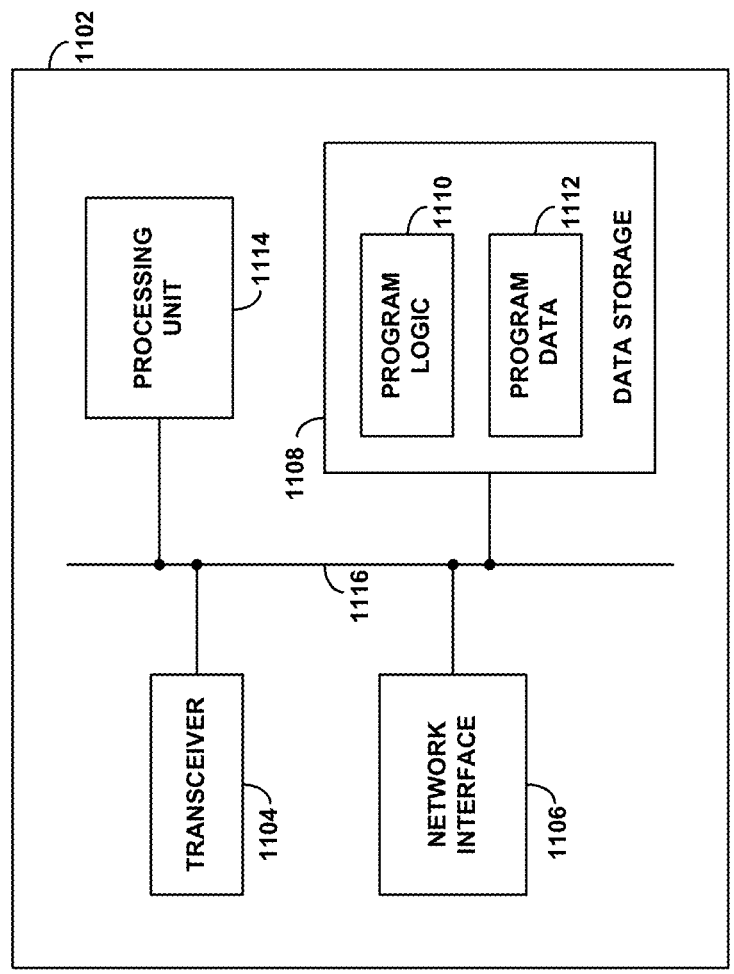
FIG. 11 is a block diagram of an example base station in which forward-link data-rate request determination based on neighbor load may be implemented.

FIG. 11 is a simplified block diagram depicting functional components of an example base station 1102 in which system-side operation of forward-link data-rate request determination based on neighbor load may be implemented. As shown in FIG. 11, the example base station 1102, representative of BTS 206 or BSC 208 integrated with BTS 206 in FIG. 2, for instance, includes a transceiver 1104, network interface 1106, a processing unit 1114, and data storage 1108, all of which may be coupled together by a system bus 1116 or other mechanism. In addition, the base station may also include external storage, such as magnetic or optical disk storage, although this is not shown in FIG. 11.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of base station 1102 relevant to dynamic adaptation of synchronized determination of rate control are discussed briefly below.

Network interface 1106 enables communication on a network, such network 200. As such, network interface 1106 may take the form of trunk or optical link that can be coupled with a TDM switch such as MSC 210, or an Ethernet network interface card or other physical connection that can be coupled with PCF 216, for instance. Further, network interface 1106 in combination with transceiver 1104, which may include one or more BTS antennas, enables air interface communication with one or more access terminals, supporting forward-link transmissions of protocol version messages, among other message and commands, and supporting reception reverse-link traffic on reverse links.

Processing unit 1114 comprises one or more general-purpose processors (e.g., INTEL microprocessors) and/or one or more special-purpose processors (e.g., dedicated digital signal processor, application specific integrated circuit, etc.). In turn, the data storage 1108 comprises one or more volatile and/or non-volatile storage components, such as magnetic or optical memory or disk storage. Data storage 1108 can be integrated in whole or in part with processing unit 1114, as cache memory or registers for instance. As further shown, data storage 1108 is equipped to hold program logic 1110 and program data 1112.

Program logic 1110 may comprise machine language instructions that define routines executable by processing unit 1114 to carry out various functions described herein. In particular the program logic, communication interface, and transceiver may operate cooperatively to carry out logical operation such as that discussed above and illustrated in FIG. 9.

It will be appreciated that there can be numerous specific implementations of a base station (or BTS or other RAN element), such as base station 1102, in which the system-side method of forward-link data-rate request determination based on neighbor load could be implemented. Further, one of skill in the art would understand how to devise and build such an implementation. As such, base station 1102 is representative of means for carrying out the system-side method of forward-link data-rate request determination based on neighbor load, in accordance with the methods and steps described herein by way of example.

5. Conclusion

An example embodiment of the present invention has been described above. Those skilled in the art will understand, however, that changes and modifications may be made to this embodiment without departing from the true scope and spirit of the invention, which is defined by the claims.

What is claimed:

1. In an access terminal configured to operate in a wireless communication system that includes a plurality of wireless coverage areas, a method comprising:
   determining a signal-to-noise ratio (SNR) measurement of a forward link from a serving wireless coverage area of the plurality based on a ratio of (i) a transmission power level of a serving signal received from the serving wireless coverage area to (ii) a transmission power level of a contributing signal received concurrently from each of at least one other wireless coverage areas of the plurality;
   receiving a message from the wireless communication system with information indicative of an average utilization taken over respective forward-link utilizations of one or more wireless coverage areas other than the serving wireless coverage area that are each detected by the access terminal above a threshold power level;
   determining a requested forward-link data rate from the serving wireless coverage area based on both the SNR measurement and a comparison of the average utilization with a threshold utilization; and
   transmitting the requested forward-link data rate to the serving wireless coverage area,
   wherein determining the requested forward-link data rate from the serving wireless coverage area based on both the SNR measurement and the comparison of the average utilization with the threshold utilization comprises:
   determining an initial forward-link data rate based on the SNR measurement;
   increasing the initial forward-link data rate to yield the requested forward-link data rate if the average utilization is below a threshold utilization; and
   decreasing the initial forward-link data rate to yield the requested forward-link data rate if the average utilization is not below the threshold utilization.

2. The method of claim 1, wherein the serving signal received from the serving wireless coverage area is a pilot signal of the serving wireless coverage area,
   and wherein the contributing signal received concurrently from each of the at least one other wireless coverage area of the plurality is a respective pilot signal of each of the at least one other wireless coverage area received concurrently with the pilot signal of the serving wireless coverage area.

3. The method of claim 2, wherein the access terminal is further configured to operate according to a CDMA family of protocols including at least IS-856,
   and wherein the SNR measurement is one of Carrier-to-Interference (C/I) and Signal to Interference plus Noise (SINR).

4. The method of claim 1, wherein the access terminal is further configured to operate according to a CDMA family of protocols including at least IS-856,
   wherein each wireless coverage area of the plurality of wireless coverage areas comprises a base station and at least one of a cell and a sector,
   and wherein receiving the message from the wireless communication system with information indicative of the average utilization taken over the respective forward-link utilizations of the one or more wireless coverage areas other than the serving wireless coverage area that are each detected by the access terminal above a threshold power level comprises receiving a slot-utilization message indicating a forward-link traffic-channel timeslot utilization for each given cell and given sector in a neighbor list of the access terminal.

5. The method of claim 4, wherein the slot-utilization message is neighbor list message.

6. The method of claim 1, wherein the access terminal is further configured to operate according to a CDMA family of protocols including at least IS-856,
   wherein the SNR measurement is one of Carrier-to-Interference (C/I) and Signal to Interference plus Noise (SINR),
   wherein the average utilization taken over respective forward-link utilizations of the one or more wireless coverage areas other than the serving wireless coverage area that are each detected by the access terminal above a threshold power level comprises an average timeslot utilization of forward traffic channels from cells and sectors in a neighbor list of the access terminal,
   wherein determining the initial forward-link data rate based on the SNR measurement comprises determining a Data Rate Control (DRC) code based on one of C/I and SINR, the DRC code indicating a particular forward-link data rate,
   wherein increasing the initial forward-link data rate to yield the requested forward-link data if the average utilization is below a threshold utilization comprises changing the determined DRC code to indicate a higher requested data rate than the particular forward-link data rate if the average timeslot utilization is below a threshold timeslot utilization,
   and wherein decreasing the initial forward-link data rate to yield the requested forward-link data rate if the average utilization is not below the threshold utilization comprises changing the determined DRC code to indicate a lower requested data rate than the particular forward-link data rate if the average timeslot utilization is not below a threshold timeslot utilization.

7. The method of claim 6, wherein transmitting the requested forward-link data rate to the serving wireless coverage area comprises transmitting the changed determined DRC code to the serving wireless coverage area.

8. The method of claim 1, further comprising:
   after transmitting the requested forward-link data rate to the serving wireless coverage area, determining a packet error rate of data packets received on a forward-link traffic channel from the serving wireless coverage area;
   if the average utilization is below the threshold utilization and the determined packet error rate is above a threshold error rate, determining an updated forward-link data rate by decreasing the requested forward-link data rate;
   if the average utilization is below the threshold utilization and the determined packet error rate is not above the threshold error rate, determining the updated forward-link data rate by maintaining the requested forward-link data rate;
if the average utilization is not below the threshold utilization and the determined packet error rate is below the threshold error rate, determining the updated forward-link data rate by increasing the requested forward-link data rate;
if the average utilization is not below the threshold utilization and the determined packet error rate is not below the threshold error rate, determining the updated forward-link data rate by maintaining the requested forward-link data rate; and
transmitting the updated forward-link data rate to the serving wireless coverage area.

9. An access terminal configured to operate in a wireless communication system that includes a plurality of wireless coverage areas, the access terminal comprising:
means for determining a signal-to-noise ratio (SNR) measurement of a forward link from a serving wireless coverage area of the plurality based on a ratio of (i) a transmission power level of a serving signal received from the serving wireless coverage area to (ii) a transmission power level of a contributing signal received concurrently from each of at least one other wireless coverage areas of the plurality;
means for receiving a message from the wireless communication system with information indicative of an average utilization taken over respective forward-link utilizations of one or more wireless coverage areas other than the serving wireless coverage area that are each detected by the access terminal above a threshold power level;
means for determining a requested forward-link data rate from the serving wireless coverage area based on both the SNR measurement and a comparison of the average utilization with a threshold utilization; and
means for transmitting the requested forward-link data rate to the serving wireless coverage area,
wherein determining the requested forward-link data rate from the serving wireless coverage area based on both the SNR measurement and the comparison of the average utilization with the threshold utilization comprises:
determining an initial forward-link data rate based on the SNR measurement;
increasing the initial forward-link data rate to yield the requested forward-link data rate if the average utilization is below a threshold utilization; and
decreasing the initial forward-link data rate to yield the requested forward-link data rate if the average utilization is not below the threshold utilization.

10. The access terminal of claim 9, wherein the serving signal received from the serving wireless coverage area is a pilot signal of the serving wireless coverage area,
and wherein the contributing signal received concurrently from each of the at least one other wireless coverage area of the plurality is a respective pilot signal of each of the at least one other wireless coverage area received concurrently with the pilot signal of the serving wireless coverage area.

11. The access terminal of claim 10, wherein the access terminal is further configured to operate according to a CDMA family of protocols including at least IS-856,
and wherein the SNR measurement is one of Carrier-to-Interference (C/I) and Signal to Interference plus Noise (SINR).

12. The access terminal of claim 9, wherein the access terminal is further configured to operate according to a CDMA family of protocols including at least IS-856,
wherein each wireless coverage area of the plurality of wireless coverage areas comprises a base station and at least one of a cell and a sector,
and wherein receiving the message from the wireless communication system with information indicative of the average utilization taken over the respective forward-link utilizations of the one or more wireless coverage areas other than the serving wireless coverage area that are each detected by the access terminal above a threshold power level comprises receiving a slot-utilization message indicating a forward-link traffic-channel timeslot utilization for each given cell and given sector in a neighbor list of the access terminal.

13. The access terminal of claim 12, wherein the slot-utilization message is neighbor list message.

14. The access terminal of claim 9, wherein the access terminal is further configured to operate according to a CDMA family of protocols including at least IS-856,
wherein the SNR measurement is one of Carrier-to-Interference (C/I) and Signal to Interference plus Noise (SINR),
wherein the average utilization taken over respective forward-link utilizations of the one or more wireless coverage areas other than the serving wireless coverage area that are each detected by the access terminal above a threshold power level comprises an average timeslot utilization of forward traffic channels from cells and sectors in a neighbor list of the access terminal,
wherein determining the initial forward-link data rate based on the SNR measurement comprises determining a Data Rate Control (DRC) code based on one of C/I and SINR, the DRC code indicating a particular forward-link data rate,
wherein increasing the initial forward-link data rate to yield the requested forward-link data if the average utilization is below a threshold utilization comprises changing the determined DRC code to indicate a higher requested data rate than the particular forward-link data rate if the average timeslot utilization is below a threshold timeslot utilization,
and wherein decreasing the initial forward-link data rate to yield the requested forward-link data if the average utilization is not below the threshold utilization comprises changing the determined DRC code to indicate a lower requested data rate than the particular forward-link data rate if the average timeslot utilization is not below a threshold timeslot utilization.

15. The access terminal of claim 14, wherein transmitting the requested forward-link data rate to the serving wireless coverage area comprises transmitting the changed determined DRC code to the serving wireless coverage area.

16. The access terminal of claim 9, further comprising:
means for determining a packet error rate of data packets received on a forward-link traffic channel from the serving wireless coverage area after transmitting the requested forward-link data rate to the serving wireless coverage area;
means for determining an updated forward-link data rate by decreasing the requested forward-link data rate if the average utilization is below the threshold utilization and the determined packet error rate is above a threshold error rate;
means for determining the updated forward-link data rate by maintaining the requested forward-link data rate if the average utilization is below the threshold utilization and the determined packet error rate is not above the threshold error rate;

means for determining the updated forward-link data rate by increasing the requested forward-link data rate if the average utilization is not below the threshold utilization and the determined packet error rate is below the threshold error rate;

means for determining the updated forward-link data rate by maintaining the requested forward-link data rate if the average utilization is not below the threshold utilization and the determined packet error rate is not below the threshold error rate; and means for transmitting the updated forward-link data rate to the serving wireless coverage area.

* * * * *